Figure 1:
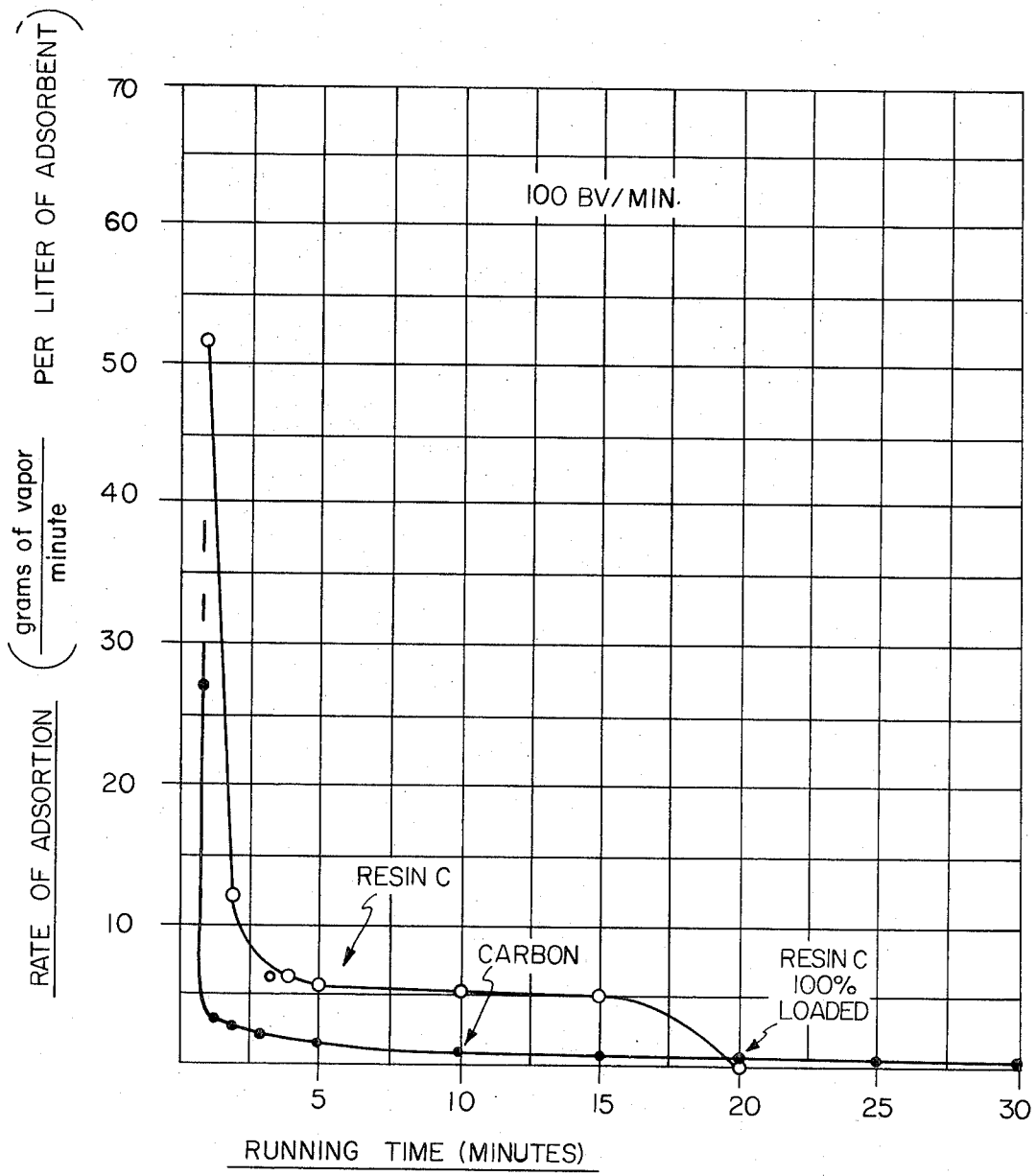
Figure 2:
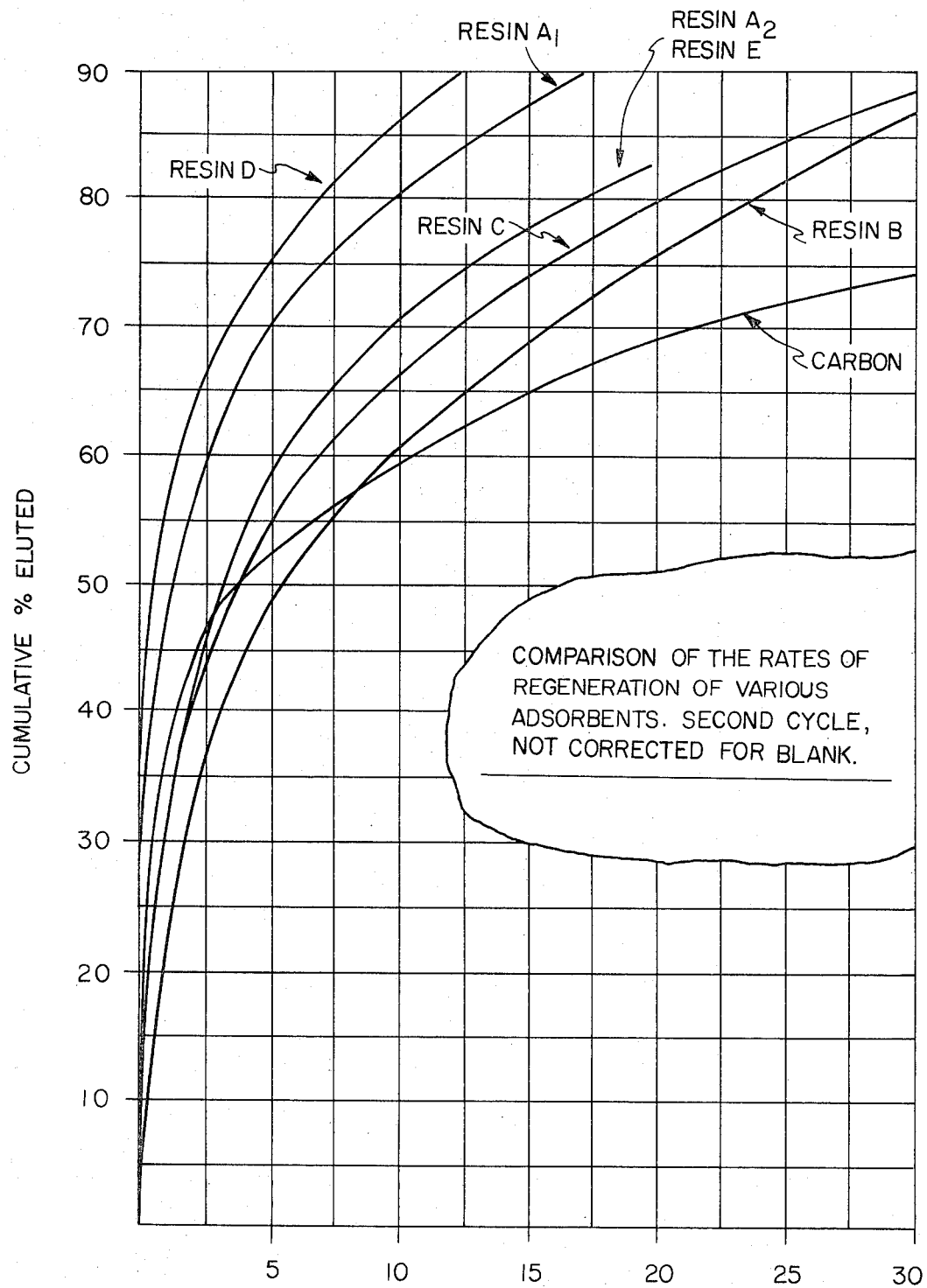

United States Patent [19]

Kennedy et al.

[11] 3,805,493
[45] Apr. 23, 1974

[54] FUEL EVAPORATIVE EMISSION CONTROL BASED ON POLYMERIC ADSORBENTS

[75] Inventors: David C. Kennedy, Malvern, Pa.; John Paleos, Zurich, Switzerland

[73] Assignee: Rohm and Haas Company, Philadelphia, Pa.

[22] Filed: Nov. 30, 1971

[21] Appl. No.: 203,290

[52] U.S. Cl. .................................................. 55/74
[51] Int. Cl. ............................................ B01d 53/84
[58] Field of Search ................. 55/67, 74, 387, 73

[56] References Cited
UNITED STATES PATENTS 3,686,827  8/1972  Haigh et al. ............................ 55/74
3,357,158  12/1967  Hollis ..................................... 55/67
3,547,684  12/1970  Hollis et al. ............................ 55/67
3,564,818  2/1971  Lasky et al. ............................ 55/73
3,727,379  4/1973  Bijleveld ................................ 55/73

Primary Examiner—Charles N. Hart
Attorney, Agent, or Firm—H. Jolyon Lammers

[57] ABSTRACT

This invention relates to an adsorption based process for the prevention of the emission of vaporous hydrocarbons by their adsorption and desorption. More particularly, it relates to a method of achieving control of air pollution caused by air dissipation of vaporized fuels used in internal combustion engines.

16 Claims, 2 Drawing Figures

FUEL EVAPORATIVE EMISSION CONTROL BASED ON POLYMERIC ADSORBENTS

BACKGROUND OF THE INVENTION

It is well established that granular activated carbon has practical utility in trapping volatile fuels by adsorption which are emitted from motor vehicle fuel tanks and carburetors. The loaded carbon is regenerated with a stream of ambient air, and the desorbed fuel vapors are combusted in the internal combustion engine. This procedure is termed fuel evaporative emission control (FEEC).

Operable though it may be, carbon is plagued by: a) progressive loss of capacity following the first cycle of use, which will lead to a low steady state capacity of the system; b) non-uniform desorption of the adsorbed hydrocarbon vapors from the carbon bed, that is highly undesired in commercial applications; c) inherent brittleness and tendency to powder; d) low capacity for hydrocarbon vapors.

In sum, the currently available method leaves much room for improvement in an era of greater demand for air pollution abatement caused by motor vehicle sources.

It is, therefore, an object of the present invention to provide a more economical and technically efficient process for the prevention of emission of vaporized hydrocarbons from motor vehicle sources.

It is another object to provide an adsorption system for vaporous hydrocarbons which system can be readily and efficiently regenerated with air for multiple cycles of use.

It is a further object to provide a more compact adsorbent system than possible with an activated carbon, without any appreciable decrease in capacity, thereby permitting design of a more economical system.

A yet further object is to provide an adsorbent of superior physical properties in normal use and thus greater useful life.

A still further object is to provide a system which adsorbs hydrocarbons more efficiently.

It has been conceived and demonstrated that certain polymeric, macroreticular adsorbents are effective in adsorbing hydrocarbon vapors from air, and that these vapors can be readily removed from the adsorbent by application of air, making some available for disposal by combustion.

The above-described process should be of great utility as an air pollution abatement system in the motor vehicle age, and is superior to the present day activated carbon systems.

The presently preferred macroreticular resins are the high-surface area, acrylic, polymeric adsorbents. They appear to offer the greatest range of applicability and combine highest capacity with superior regeneration properties. They are therefore preferred over the non-polar, aromatic adsorbents. However, these non-polar, aromatic adsorbents are still much preferred over activated carbon.

EVALUATION PROCEDURE

The U.S. Environmental Protection Agency evaluates the effectiveness of FEEC devices by means of full-scale tests using various size automobiles. For laboratory evaluation of adsorbents, an apparatus and test procedure were devised which permitted one to:

1. Approximate the conditions which exist in the full scale U.S. E.P.A. tests;

2. Characterize as clearly as possible the important differences in adsorption properties that exist between the various candidate adsorbents and activated carbon.

The operating parameters of the apparatus are detailed in Table I below.

TABLE I

Experimental Conditions for FEEC Procedure

| | |
|---|---|
| Volume of Adsorbent: | 10 cm$^3$ |
| Temperature of Adsorbent: | 100°F Loading |
| | 120°F Regenerating |
| Nitrogen Flow: | 2.0 SCFH = 100 Bed Volumes/minute |
| Nitrogen Temperature: | 100°F Loading |
| | 120°F Regenerating |
| Gasoline: | 500 ml. of ESSO Premium (Winter Grade) maintained at 100°F. |
| Time: | 45 minutes Loading |
| | 30 minutes Regenerating |

Dry nitrogen is bubbled at a rate of 2 standard cubic feet per hour (SCFH) through 500 ml of gasoline heated to 100°F. The gasoline-laden nitrogen then passes through a column containing 10 ml of adsorbent situated on an analytical balance. The entire balance is maintained at 100°F to prevent simple construction of gasoline vapors. The weight gain of the adsorbent tube was measured as a function of time for a period of 45 minutes.

At this point, loading was stopped and the balance temperature was quickly raised to 120°F. Dry nitrogen heated to 120°F was then passed through the tube (25 SCFH) to desorb the gasoline vapors. Weight loss was monitored as a function of time during a standard 30 minute regeneration period.

Using the above apparatus and procedure, it is possible to quantitatively evaluate several important adsorbent properties. These are:

1. The capacity of the adsorbent for hydrocarbon vapors;

2. The kinetics of adsorption;

3. The kinetics of regeneration;

4. The completeness of regeneration;

5. The effect of multiple-cycling adsorbent capacity.

An evaluation was also made of the degrees of attrition of several candidate adsorbents compared with activated carbon. Samples of the adsorbents were screened to +50 mesh and 100 ml of the screened materials were placed in cans and sealed. The cans were placed on a Burrell Wrist-Action Shaker and agitated continuously. Periodically,

TABLE II.—GENERAL COMPARISON OF ADSORBENTS

| Adsorbent | Hydrocarbon capacity[2] grams per liter of adsorbent | "Normalized volume" liters of ads. req'd to sorb 50 g.) | Percent eluted in one minute | Weight eluted in one minute from "normalized volume" (gram) | Percent eluted in 20 minutes |
|---|---|---|---|---|---|
| Resin F | 47 | 1.06 | 34 | 17 | 85 |
| Activated carbon[1] | 50 | 1.00 | 36 | 18 | 78 |
| Resin D | 55 | 0.91 | 56 | 28 | 96 |
| Resin E | 66 | 0.76 | 38 | 19 | 95 |
| Resin $A_1$ | 70 | 0.72 | 46 | 23 | 91 |
| Resin $A_2$ | 76 | 0.66 | 29 | 14 | 87 |
| Resin $G_1$ | 101 | 0.50 | 31 | 16 | 76 |
| Resin C | 110 | 0.46 | 32 | 16 | 80 |
| Resin B | 152 | 0.34 | 26 | 13 | 74 |
| Resin $G_2$ | 93 | 0.54 | 35 | 18 | 91 |

[1] Pittsburgh activated carbon grade BPL (−12,+30 mesh) was used in all runs.
[2] All data are from second cycle and are corrected for blank.

the absorbents were removed from the cans and screened. The amount of −60 mesh material was weighed and attributed to attrition.

B. LOADING AND ELUTION STUDIES

The results of the loading and elution studies are summarized in Table II. From these data, it can be seen that the MR resin adsorbents give rise to an unexpected diversity in adsorption behavior.

The capacity of certain adsorbents for hydrocarbon vapors, as measured by the test apparatus, is of great interest. In Table II, it can be seen that most of the candidate adsorbents surpassed the capacity of activated carbon on the second cycle. It is noteworthy that the first cycle capacity of activated carbon was 155 grams/liter. (Table III below).

TABLE III

Hydrocarbon Capacity as a Function of Multiple Cycling

| Adsorbent | Capacity (grams/liter of Adsorbent) | | |
|---|---|---|---|
| | 1st Cycle | 2nd Cycle | 3rd Cycle |
| Activated Carbon | 155 | 50 | 47 |
| Resin $A_2$ | 80 | 76 | 76 |
| Resin B | 193 | 152 | — |
| Resin E | 90 | 66 | 65 |

It is apparent that activated carbon loses capacity at a greater rate than any of the polymeric adsorbents evaluated.

In FIG. I are presented loading-rate curves for Resin C and activated carbon. Resin C adsorbs hydrocarbon vapors very rapidly and reaches saturation capacity long before the end of the 45 minute loading period.

The adsorption curve of activated carbon is much less satisfactory. Nearly half the total weight of vapor is accumulated in the first minute, after which the rate of adsorption abruptly decreases. Saturation capacity is not achieved even after 45 minutes.

The elution kinetics are of even greater importance than the adsorption kinetics. Rapid elution is of course necessary to give complete regeneration during the rather short time that can be alloted. On the other hand, too rapid a rate of regeneration is a disadvantage, and could lead to what is termed an over rich fuel condition in the carburetor. This could contribute to the air pollution through the generation of unburned hydrocarbons.

The results of the regeneration studies are summarized in the last three columns of Table II and Figure II. Regarding Table II, in the initial rate of elution, the percent of elution in one minute of activated carbon is bracketed by the performance of the MR resin adsorbents. In all cases, the candidate adsorbents are more completely regenerated within 10 minutes than is activated carbon.

In Figure II, the difference between the resins and activated carbon are more clearly seen. The initial rate of elution of activated carbon is undesirably rapid, with about 50 percent of the adsorbed hydrocarbon being eluted in the first minute. However, thereafter the rate rapidly decreases and results in activated carbon having a poor overall elution. In contrast, Resin C gives a more moderate initial rate of elution, yet is more completely regenerated than carbon after 20 minutes. Among the other tested adsorbents, the rates of elution vary considerably. On one extreme, Resin D is very rapid, with more than 50 percent being eluted in the first minute. At the other extreme, Resin B gives a much slower, more controlled elution of adsorbed hydrocarbons with only 25 percent eluted in the first minute. This rate is less than the most preferred Resin C, it nevertheless is quite useful, and clearly superior to carbon.

C. ATTRITION TEST

The results of the attrition test described in Section A are presented in Table IV. As expected, activated carbon has the highest degree of attrition. Some of the adsorbents, notably Resin C, exhibit no breakdown.

TABLE IV

Attrition of Candidate Adsorbents After 200 Hours

| Adsorbent | Relative Magnitude of Attrition |
|---|---|
| Carbon Standard | 200 |
| Resin $A_1$ | 0 |
| Resin $A_2$ | 60 |
| Resin B | 33 |
| Resin C | 0 |
| Resin E | 40 |
| Resin D | 100 |
| Resin F | 50 |

In the foregoing tables the chemical identity of the evaluated resins follows in Table V:

TABLE V

Resin $A_1$ — A copolymer of 20 percent divinylbenzene (DVB) plus 80 percent styrene (U.S. Pat. No. 3,531,463)

Resin $A_2$ — A copolymer of 50 percent divinylbenzene (DVB) plus 50 percent styrene and ethylvinylbenzene (U.S. Pat. No. 3,531,463).

Resin B — A copolymer of 85 percent divinylbenzene and 15 percent ethylvinylbenzene (U.S. Pat. No. 3,531,463).

Resin C — Homopolymer of trimethylolpropane trimethacrylate.

Resin D — Resin $A_2$ post-reacted to contain a diaryl sulfoxide functionality

Resin E — A copolymer of trimethylolpropane trimethacrylate and methylmethacrylate.

Resin F — A copolymer of trimethylolpropane trimethacrylate and diacetone acrylamide.

Resin $G_1$ — A copolymer of trimethylolpropane trimethacrylate and butyl methacrylate Resin $G_2$ — Resin $A_1$ prepared with a diisobutyl ketone phase extender.

According to the present invention, the resins which may be usefully employed as described herein are essentially:

a. non-iongenic macroreticular water-insoluble cross-linked polymer of (1) polymerized ethylenically unsaturated monomers comprising about 2 to 100 weight percent of at least one poly(vinyl) benzene monomer selected from the group consisting of divinylbenzene, trivinylbenzene, and alkyl divinylbenzenes having from 1 to 3 alkyl groups of 1 to 2 carbon atoms substituted in the benzene nucleus; or (2) 10 to 100 percent by weight of a polyfunctional methacrylate containing at least three methacrylate groups, wherein the polymer contains 90 percent to 0 percent by weight of a comonomer; or derivatives, and which may be monoethylenically unsaturated, or which may be a difunctional comonomer or derivative of the above, containing sulfonic acid, amine oxide, sulfoxide, amides, or ketone groups. Such polymer has a surface area of at least 10 to 1,000 square meters per gram, having a porosity of at least 25 percent ranging up to 75 percent, and having pores of an average diameter of at least 20 A ranging up to 20,000 A;

EXAMPLE I

SYNTHESIS OF TRIMETHYLOLPROPANE TRIMETHACRYLATE POLYMER (RESIN C)

Resin C is prepared as follows: 6,000 grams of water, 180 grams (3.0 percent of water) of sodium chloride, 6 grams (0.2 percent of organic phase) of gelatin, and 72 grams of a 12.5 wt. percent aqueous solution of sodium polyacrylate (0.3 wt. percent of organic phase is sodium polyacrylate) are mixed in a twelve liter flask until a homogeneous solution resulted. After the pH of the aqueous solution is adjusted to 8 to 9 with concentrated aqueous ammonia a mixture of 900 grams (2.66 moles) of commercial trimethylolpropane trimethacrylate with 9 grams (1.0 wt. percent of monomer) of lauroyl peroxide, and 2,100 grams (22.79 moles, 70 wt. percent of the organic phase) of toluene is introduced into the reactor. (The commercial trimethylolpropane trimethacrylate analyzed by gas-liquid chromatography to be 92 percent triester and 8 percent diester, i.e., trimethylolpropane dimethacrylate). The dispersion of organic liquid in an aqueous phase is prepared at ambient temperature at 80 rpm with on-off agitation cycles until only droplet and aqueous phases remains in the absence of stirring. Formation of the dispersion requires approximately fifteen minutes. The droplets are polymerized under nitrogen at 65°C. for 20 hours into solid, opaque spheres, washed, and dried. The yield of dried copolymer is 896 grams or 99.5 percent of theory. The physical characteristics of the porous beads are:

appearance — opaque white
apparent density, $g.ml.^{-1}$ — 0.564
skeletal density, $g.ml.^{-1}$ — 1.245
Porosity, Fol. percent — 55
surface area, $m^2 g.^{-1}$ — 450
average pore diameter, A — 90
Percentage decoloration — 75

EXAMPLE II

SYNTHESIS OF A POROUS COPOLYMER CONTAINING DIARYL SULFOXIDE FUNCTIONALITIES (RESIN D)

To a blackened 1-liter flask, equipped with a stirrer, condenser, gas inlet tube, and a thermometer are added 63.0 grams of dried Resin A (DVB polymer) and 200 grams of ethylene dichloride. A sweep of dry nitrogen is started and the beads are allowed to swell for 30 minutes at room temperature with agitation.

In a separate flask, 65.0 grams of thionyl chloride is dissolved in 100 grams of ethylene dichloride and 53.4 grams of solid, anhydrous aluminum chloride are added to the stirring solution while maintaining the temperature under 35°C. After all the aluminum chloride has dissolved, the mixture is added to the pre-swollen beads at a rate such that the temperature remains 35°C. *During this step and subsequent steps until the reaction is quenched, hydrogen chloride gas is liberated. Precaustions are taken so that the batch will not purge as a result of rapid gas evolution. The times and conditions given here should prevent such rapid liberation of hydrogen chloride.

The flask is stirred at room temperature (< 35°C.) for two hours and then is slowly heated over a period of about one hour to reflux temperature (80°–85°C.) Reflux is maintained for an additional two hours, and then the reaction is cooled to about 10°C. in an ice bath. There then is added 100.0 grams of benzene, at a rate such that the temperature does not exceed 30°C. After all the benzene has been added, the reaction mixture is stirred at room temperature (< 35°C.) for one hour. Heat is then slowly applied to attain reflux and the reaction is maintained at reflux temperature for two hours. The mixture is cooled to 15°C. and then quenched by pouring same into 500 ml. of an ice-cold, 10 percent hydrochloric acid — water mixture at a rate such that the temperature does not exceed 50°C.

The quench solution is stirred for two hours to decompose aluminum salts after which the beads are filtered and washed twice with water. The beads are retransferred as a slurry to the reaction flask and an azeotrope distillation procedure is performed to remove imbibed organic solvents. The excess water is siphoned from the flask and the beads are washed with additional water until the wash water is neutral to pH paper. Excess water is siphoned from the flask and the beads are packed out wet. A 20 to 30 mesh cut is dried and measured for physical properties.

Appearance: — Opaque brown beads
Elemental Analysis: — 8.28% S, 5.26% O, 1.61% Cl, 75.29% C, 7.24% H,
Apparent Density: — 0.731 grams/cm³
Skeletal Density: — 1.218 grams/cm³
Porosity: — 39.9 volume percent
Surface Area: — 31.9 meters²/gram
Average Pore Diameter: — 68 Angstroms

EXAMPLE III

SYNTHESIS OF COPOLYMER OF TRIMETHYLOL-PROPANE TRIMETHYACRYLATE AND METHYL METHACRYLATE (RESIN E)

Into a 500 ml. flask are placed 208.6 grams of aqueous liquid and 101.0 grams of immiscible organic liquid containing the monomers, of that the weight ratio of aqueous to organic phases is approximately two to one. The composition of the aqueous phase is 400 grams of water, 12 grams of sodium chloride (3.0 wt. percent of water), 0.8 grams of gelatin (0.2 wt. percent of organic phase), and 9.6 grams of 12.5 wt. percent sodium polyacrylate in water (0.3 wt. percent of organic phase is sodium polyacrylate).

The composition of the organic layer is 50 grams (0.148 mole) methyl methacrylate inhibited with 200 ppm monomethyl ether of hydroquinone, 50 grams (0.07388 mole) commercial trimethylolpropane trimethacrylate (TMPTMA) which contains 93 wt. percent trimethylolpropane trimethacrylate and 7 wt. percent dimethacrylate ester, 100 grams (0.979 mole, 50 wt. percent of organic phase) of methyl isobutylcarbinol (MIBC), and 1.0 grams (1.0 percent of monomer weight) lauroyl peroxide.

In this procedure the molar ratio of butyl methacrylate to the trifunctional cross-linker is 3.12 and the molar ratio of monomer solvent (MIBC) to copolymer is 1.3435.

After introduction of the aqueous solution, sufficient concentrated aqueous ammonium hydroxide (several drops) is added to raise the pH to within the range of 8 to 9. After flushing the system with nitrogen, the immiscible mixture is stirred at ambient temperature (about 25°C.) at 150 rpm, with as many on-off stirring cycles as necessary to disperse completely all the organic liquid into small droplets (0.2 to 0.5 mm diameters) in the aqueous layer. When the system, in the absence of agitation, no longer formed a separate organic layer distinct from the droplet and water layers, the dispersion is heated in an atmosphere of nitrogen at 65°C. for twenty hours with the same agitation used to develop the droplets in order to polymerize the liquid monomer into solid spheres. The product, a copolymer of 44.8 percent TMPTMA, 5.2 percent Trimethylolpropane dimethacrylate (TMPDMA), and 50 percent methylmethacrylate, is cooled to ambient temperature, washed and dried. The yield of dried product is 99 grams or 98 percent of theory. The copolymer's physical properties are tabulated below: (Resin A of the Decolorization Performance Data)

appearance — opaque white
Apparent density, g.ml.$^{-1}$ — 0.605
skeletal density, g.ml.$^{-1}$ — 1.243
porosity, ml. pores (ml. beads)$^{-1}$ — 0.513
Internal surface area, m.$^2$g$^{-1}$ — 160
average pore diameter, A — 212

EXAMPLE IV

SYNTHESIS OF POROUS COPOLYMER OF 50 WEIGHT PERCENT DIACETONE ACRYLAMIDE (N-[2-(2-METHYL-4OXOPENTYL)]-ACRYLAMIDE) AND 50 WEIGHT PERCENT TRIMETHYLOLPROPANE TRIMETHACRYLATE(RESIN F)

A dispersion of monomer droplets in water is prepared by stirring a two phase system of monomer and water at a suitable RPM at room temperature to get the proper bead size. The aqueous phase, which is present in the final dispersion at a weight ratio to organic phase of three to one, is composed of 423 gm. (23.47 moles) of water, 171 gm. (2.93 moles) of sodium chloride, and 3.0 gm. (~1.5 × 10$^{-6}$ moles) poly(vinylimidazoline) bisulfate salt (MW about 2 × 10$^6$). The poly(vinylimidazolinium bisulfate) salt is dissolved by slow addition of the powdered solid to a portion of the water with rapid mixing in a three-necked round-bottomed flask. The remainder of the water and the sodium chloride are introduced with stirring to give a homogeneous aqueous solution. The organic phase is prepared separately by mixing 35.0 gm. (0.2068 mole) diacetone acrylamide, 35.0 gm. (0.1034 mole) of commercial trimethylolpropane trimethacrylate (94 wt. percent trimethylolpropane trimethacrylate and 6 wt. percent trimethylolpropane dimethacrylate), 130.0 gm. (1.27 moles) of methylisobutylcarbinol, and 0.7 gm. (1.756 × 10$^{-3}$ mole) lauroyl peroxide until homogeneous. The organic solution is poured into the reactor, and the organic droplets are formed in the aqueous medium by stirring (183 RPM). When all the organic phase has been transformed into droplets with no remaining bulk phase, the system is heated to 65°C. and held at this temperature for 20 hours. The resulting opaque copolymer is cooled to room temperature; freed of mother liquor; washed three times with water (one bed-volume each wash), five times with methanol, three times with ethylene dichloride, four times with methanol; and dried overnight in a steam oven at 75°C. A 20 to 30 mesh cut of U.S. Sieve Series is measured for physical properties. The yield of dried copolymer is 95.7 percent of theory. The weight percent nitrogen in the final copolymer measures 3.94 percent. The physical properties are given below:

appearance — opaque white or off-white
apparent density, g. cm.$^{-1}$ — 0.692
skeletal density, g. cm.$^{-1}$ — 1.181
porosity, vol. percent — 41.4
surface area, m$^2$ g.$^{-1}$ — 114
average pore diameter, A — 213

EXAMPLE V

SYNTHESIS OF COPOLYMER OF TRIMETHYLOLPROPANE TRIMETHACRYLATE AND BUTYL METHACRYLATE (RESIN G$_1$)

Into a 500 ml. flask are placed 208.6 grams of aqueous liquid and 101.0 grams of immiscible organic liquid containing the monomers, of that the weight ratio of aqueous to organic phases is approximately two to one. The composition of the aqueous phase is 400 grams of water, 12 grams of sodium chloride (3.0 wt. percent of water), 0.8 grams of gelatin (0.2 wt. percent of organic phase), and 9.6 grams of 12.5 wt. percent sodium polyacrylate in water (0.3 wt. percent of organic phase is sodium polyacrylate).

The composition of the organic layer is 50 grams (0.148 mole) butyl methacrylate inhibited with 200 ppm monomethyl ether of hydroquinone, 25 grams (0.07388 mole) commercial trimethylolpropane trimethacrylate (TMPTMA) which contains 93 wt. percent trimethylolpropane trimethacrylate and 7 wt. percent dimethacrylate ester, 100 grams (0.979 mole, 50 wt. percent of organic phase) of methyl isobutylcarbinol (MIBC), and 1.0 grams (1.0 percent of monomer weight) lauroyl peroxide.

In this procedure the molar ratio of butyl methacrylate to the trifunctional crosslinker is 3.12 and the molar ratio of monomer solvent (MIBC) to copolymer is 1.3435.

After introduction of the aqueous solution, sufficient concentrated aqueous ammonium hydroxide (several drops) is added to raise the pH to within the range of 8 to 9. After flushing the system with nitrogen, the immiscible mixture is stirred at ambient temperature (about 25°C.) at 150 rpm, with as many on-off stirring cycles as necessary to disperse completely all the organic liquid into small droplets (0.2 to 0.5 mm diameters) in the aqueous layer. When the system, in the absence of agitation, no longer formed a separate organic layer distinct from the droplet and water layers, the dispersion is heated in an atmosphere of nitrogen at 65°C. for twenty hours with the same agitation used to develop the droplets in order to polymerize the liquid monomer into solid spheres. The product, a copolymer of 44.8 percent TMPTMA, 5.2 percent Trimethylolpropane dimethacrylate (TMPDMA), and 50 percent butyl methacrylate, is cooled to ambient temperature, washed and dried. The yield of dried product is 99 grams or 98 percent of theory. The copolymer's physical properties are tabulated below: (Resin A of the Decolorization Performance Data)

appearance — opaque white
Apparent density, g.ml.$^{-1}$ — 0.605
skeletal density, g.ml.$^{-1}$ — 1.243
porosity, ml. pores (ml. beads)$^{-1}$ — 0.513
Internal surface area, m.$^2$g$^{-1}$ — 160
average pore diameter, A — 212

We claim:

1. A method of air pollution abatement substantially precluding dissipation into the ambient air of vaporized hydrocarbon fuel from a motor vehicle fuel tank or carburetor containing it which comprises:
   a. diverting the hydrocarbyl fuel vapors from the motor vehicle fuel tank or carburetor into a mass or bed of a macroreticular water-insoluble cross-linked polymer of polymerizable ethylenically unsaturated monomers comprising about 2 to 100 weight percent of at least one poly(vinylbenzene) monomer selected from the group consisting of divinylbenzene, trivinylbenzene, and alkyl divinylbenzenes having from 1 to 3 alkyl groups of 1 to 2 carbon atoms substituted in the benzene nucleus or derivatives of said polymer containing a group selected from the class consisting of sulfonic acid, amine oxide, sulfoxide, amide and ketone groups; which polymer has a surface area of at least 10 to 1,000 sq. meters per gram, having a porosity of at least 25 percent ranging up to 75 percent and having pores of an average diameter of at least 20 A, ranging up to 20,000 A;
   b. flowing ambient air through the hydrocarbon-loaded polymer bed to release substantially all of the desorbed hydrocarbons;
   c. directing the desorbed hydrocarbons to an internal combustion engine for combustion.

2. A method according to claim 1 wherein the polymer is a copolymer of 100 to 15 weight percent divinylbenzene and 0 to 85 weight percent of ethylvinylbenzene and styrene.

3. A method according to claim 1 wherein the adsorbent is a copolymer of about 85 percent by weight divinylbenzene and about 15 percent by weight ethylvinylbenzene.

4. A method according to claim 1 wherein the adsorbent is a copolymer of about 50 percent by weight divinylbenzene and about 50 percent by weight styrene and ethylvinylbenzene.

5. A method according to claim 1 wherein the adsorbent is a copolymer of about 20 percent by weight divinylbenzene and about 80 percent by weight styrene and ethylvinylbenzene.

6. The method of claim 1 wherein the adsorbent comprises the phenyl sulfoxide derivative of a copolymer of about 50 percent by weight of divinylbenzene and about 50 percent by weight of styrene and ethylvinylbenzene.

7. A method according to claim 1 wherein the adsorbent is a sulfonic acid derivative of a copolymer of about 85 percent by weight of divinylbenzene and about 15 percent by weight of ethylvinylbenzene.

8. A method of air pollution abatement substantially precluding dissipation into the ambient air of vaporized hydrocarbon fuel from a motor vehicle fuel tank or carburetor containing it which comprises:
   a. diverting the hydrocarbyl fuel vapors from the motor vehicle fuel tank or carburetor into a mass or bed of a macroreticular water-insoluble cross-linked polymer composed of 10 to 100 percent by weight of a polyvinyl methacrylate containing at least three methacrylate groups, wherein the balance of the polymer to make 100 weight percent is a mono-ethylenically or diethylenically unsaturated comonomer or derivatives of said polymer containing a group selected from the class consisting of sulfonic acid, amine oxide, sulfoxide, amide, and ketone groups; which polymer has a surface area of at least 10 to 1,000 sq. meters per gram, a porosity of at least 25 percent ranging up to 75 percent and pores of an average diameter of at least 20 A, ranging up to 20,000 A;
   b. flowing the ambient air through the hydrocarbon-loaded polymer bed to release substantially all of the adsorbed hydrocarbons;
   c. directing the desorbed hydrocarbons to an internal combustion engine for combustion.

9. A method according to claim 8 wherein the non-ionogenic, macroreticular resin is in the form of small spheroidal beads of predominantly 4 up to 100 mesh size, the resin having a porosity of 30 percent ranging up to 70 percent, a specific surface area of 100 ranging to 900 square meters per gram; and an average pore diameter of 20 A to 200 A.

10. The method according to claim 8 wherein the polyfunctional methacrylate is one of the trimethylolpropane trimethacrylate or pentaerythritol tetramethacrylate.

11. Method according to claim 8 wherein the said polymer is composed from 30 to 70 percent of methyl methacrylate, and from 70 to 30 percent of trimethylolpropane trimethacrylate, both percentages being by weight.

12. The method of claim 8 wherein the adsorbent comprises 100 percent of a polyfunctional methacrylate containing at least three methacrylate groups.

13. The method of claim 8 wherein the desorbed hydrocarbons are fed to a catalytic afterburner system for combustion.

14. The method of claim 8 wherein the adsorbent comprises a copolymer of about 50 percent by weight of trimethylolpropane trimethacrylate and about 50 percent by weight of diacetone acrylamide.

15. A method according to claim 8 comprising a copolymer of about 50 percent by weight of trimethylolpropane trimethacrylate and about 50 percent by weight of methyl methacrylate.

16. A method according to claim 8 comprising a copolymer of about 50 percent by weight of trimethylolpropane trimethacrylate and about 50 percent by weight of butyl methacrylate.

* * * * *

UNITED STATES PATENT OFFICE
CERTIFICATE OF CORRECTION

Patent No. 3,805,493      Dated April 23, 1974

Inventor(s) Kennedy et al

It is certified that error appears in the above-identified patent and that said Letters Patent are hereby corrected as shown below:

Cover page, second line, "Kennedy et al" should be
--John Paleos--

Cover page, "[75] Inventors: David C. Kennedy, Malvern, Pa.; John Paleos, Zurich, Switzerland" should be --[75] Inventor: John Paleos, Zurich, Switzerland--

Col. 1, line 47, "some" should be --same--

Col. 2, line 34, "construction" should be --condensation--
line 56, insert "upon" after "multiple-cycling"

Col. 3, Table II, second line of third columnar heading, insert "(" before "liters"

fourth line below sixth columnar heading, "95" should be --85--

Col. 10, line 45, delete "the" before "trimethylol-"

In the following instances, "A" should be --Å--:
    Col. 6, line 6
    Col. 7, line 57
    Col. 8, line 40
    Col. 9, lines 28, 50 and 51
    Col. 10, line 31

UNITED STATES PATENT OFFICE
CERTIFICATE OF CORRECTION

Patent No. 3,805,493        Dated April 23, 1974

Inventor(s) John Paleos

It is certified that error appears in the above-identified patent and that said Letters Patent are hereby corrected as shown below:

Column 6, line 4, "Fol." should be --Vol.--

Signed and sealed this 26th day of November 1974.

(SEAL)
Attest:

McCOY M. GIBSON JR.
Attesting Officer

C. MARSHALL DANN
Commissioner of Patents